(12) United States Patent
Preckel et al.

(10) Patent No.: US 9,517,599 B2
(45) Date of Patent: Dec. 13, 2016

(54) METHOD FOR PRODUCING AND TREATING CONTAINERS

(75) Inventors: Katrin Preckel, Gelsenkirchen (DE); Martin Schach, Bochum (DE); Markus Reiniger, Monchengladbach (DE)

(73) Assignee: KHS GmbH, Dortmund (DE)

( * ) Notice: Subject to any disclaimer, the term of this patent is extended or adjusted under 35 U.S.C. 154(b) by 807 days.

(21) Appl. No.: 13/816,857

(22) PCT Filed: Jul. 20, 2011

(86) PCT No.: PCT/EP2011/003627
§ 371 (c)(1),
(2), (4) Date: Feb. 13, 2013

(87) PCT Pub. No.: WO2012/028225
PCT Pub. Date: Mar. 8, 2012

(65) Prior Publication Data
US 2013/0140745 A1 Jun. 6, 2013

(30) Foreign Application Priority Data
Aug. 31, 2010 (DE) ........................ 10 2010 036 028

(51) Int. Cl.
*B29D 22/00* (2006.01)
*B29C 49/42* (2006.01)
(Continued)

(52) U.S. Cl.
CPC ............. *B29D 22/003* (2013.01); *B29C 49/42* (2013.01); *B29C 49/4273* (2013.01);
(Continued)

(58) Field of Classification Search
CPC .... B29C 49/42; B29C 22/003; B29C 49/4273; B29C 49/78; B41J 3/4073
(Continued)

(56) References Cited

U.S. PATENT DOCUMENTS 5,259,716 A   11/1993 Hoshino et al.
6,066,081 A * 5/2000 Bachner .................... B31B 1/80
                                        493/102
(Continued)

FOREIGN PATENT DOCUMENTS

DE           60004894      7/2004
DE      10 2006 001 223    7/2007
(Continued)

*Primary Examiner* — Nahida Sultana
(74) *Attorney, Agent, or Firm* — Occhiuti & Rohlicek LLP

(57) ABSTRACT

A method for producing plastic containers by a production process, which is either drape forming and blow molding, using a preform in a drape forming or blow molding machine, and for subsequent treatment of the plastic containers in a treatment station of a container treatment line includes, prior to completion of the production process, determining first positional data associated with the container at a location, wherein the first positional data is selected from the group consisting of angular position of a container and angular position of a design feature on the container, and wherein the location is selected from the group consisting of the production machine, a conveying line that precedes the production machine, and a treatment line that precedes the production machine, and passing the first positional data to the treatment station for control thereof.

24 Claims, 3 Drawing Sheets

(51) Int. Cl.
*B29C 49/78* (2006.01)
*B41J 3/407* (2006.01)
*B29C 49/12* (2006.01)
*B29K 67/00* (2006.01)

(52) U.S. Cl.
CPC ............ *B29C 49/78* (2013.01); *B41J 3/4073* (2013.01); *B29C 49/12* (2013.01); *B29C 49/421* (2013.01); *B29C 49/4205* (2013.01); *B29C 49/4252* (2013.01); *B29C 2049/4226* (2013.01); *B29C 2049/4231* (2013.01); *B29C 2795/007* (2013.01); *B29C 2949/7805* (2013.01); *B29C 2949/7826* (2013.01); *B29C 2949/78563* (2013.01); *B29C 2949/78773* (2013.01); *B29C 2949/78781* (2013.01); *B29K 2067/003* (2013.01)

(58) Field of Classification Search
USPC ....... 264/503, 40.1, 523; 425/454, 135, 541, 425/534
See application file for complete search history.

(56) References Cited

U.S. PATENT DOCUMENTS

| | | | | |
|---|---|---|---|---|
| 6,165,395 | A * | 12/2000 | Kieras | B29C 31/002 156/64 |
| 6,183,238 | B1 * | 2/2001 | Dunlap | B29C 49/2408 264/509 |
| 6,214,282 | B1 * | 4/2001 | Katou | B65B 3/022 264/163 |
| 2003/0020193 | A1 | 1/2003 | Hamamoto et al. | |
| 2003/0075820 | A1 * | 4/2003 | Hines | B29C 43/04 264/40.1 |
| 2003/0077349 | A1 * | 4/2003 | Derouault | B29C 49/4205 425/145 |
| 2003/0105550 | A1 * | 6/2003 | Ouellette | B07C 5/3408 700/213 |
| 2006/0266003 | A1 * | 11/2006 | Topf | B67C 3/007 53/281 |
| 2007/0107801 | A1 * | 5/2007 | Cochran | B65B 3/36 141/153 |
| 2008/0223691 | A1 * | 9/2008 | Nishi | B65G 29/00 198/470.1 |
| 2009/0136613 | A1 * | 5/2009 | Linke | B29C 33/305 425/541 |
| 2011/0056275 | A1 * | 3/2011 | Calhoun | G01M 3/32 73/41 |
| 2012/0222387 | A1 * | 9/2012 | Forestelli | B67B 3/26 53/52 |

FOREIGN PATENT DOCUMENTS

| | | |
|---|---|---|
| EP | 0958124 | 8/2001 |
| EP | 1 279477 | 1/2003 |
| EP | 1806233 | 7/2007 |
| JP | 7227902 | 8/1995 |
| JP | 2000202899 | 7/2000 |

* cited by examiner

METHOD FOR PRODUCING AND TREATING CONTAINERS

CROSS REFERENCE TO RELATED APPLICATION

This application is the national phase under 35 USC 371 of international application no. PCT/EP2011/003627, filed Jul. 20, 2011, which claims the benefit of the priority date of German application no. 10 2010 036 028.7, filed Aug. 31, 2010. The contents of the aforementioned applications are incorporated herein in their entirety.

FIELD OF DISCLOSURE

The invention relates to a method for producing plastic containers.

BACKGROUND

For the purpose of the invention, "containers" are notably cans, bottles, tubes, pouches made from metal, glass and/or plastic, but also other packaging means suitable for filling liquid or viscous products for pressure filling or for pressureless filling.

For the purpose of the invention, "printing" generally means the application of one or a number of print images or imprints, notably multi-coloured print images or imprints, on the respective outer container surface, namely independent of special printing methods. The printing preferably uses print heads, also described in DE 10 2006 001 223 A1, which are known to those skilled in the art and operate according to the inkjet method. To this end, the printing colours or printing inks each are applied as fine droplets next to each other and also partly overlapping so that, overall, a multi-coloured print image results, namely after drying or curing the printing colours in the form of a colour layer or printed layer formed by the print image or imprint. For example, printing colours are used for printing the containers, said printing colours being dried or cured by energy input, i.e. by heat and/or UV radiation and/or microwave radiation and/or beta radiation, preferably by crosslinking.

For the purpose of the invention, "design feature" generally means a distinctively designed container area or container portion at least on the outer container surface, for example, but not exclusively, an embossing in the container wall, a seam generated by a blow mould during the production of the container etc.

For the purpose of the invention, the expression "substantially" means deviations from the respective exact value by +/−10%, preferably by +/−5%, and/or deviations in the form of changes insignificant to the function.

It is known to block the drape forming or blow moulding machine, which is used for drape forming or blow moulding the plastic containers, with a treatment station or treatment line, especially for direct printing, preferably for digitally printing the containers produced such that the treatment station or treatment line directly connects to the container outfeed of the drape forming or blow moulding machine.

SUMMARY

The task of the invention is to provide a method which makes it possible to produce plastic containers by blow moulding and with an imprint or print image, which is of optimum quality and has a visually attractive form, created by printing the respective outer container surface.

The treatment line, which has the at least one treatment station, directly follows, in a preferred embodiment of the invention, the drape forming or blow moulding machine or its container outlet so that, in addition to the general advantages of blocking such as compact build, simplification of the drives and machine control, reduced number of container transporters etc., a high degree of purity of the bottle surface is ensured, said degree of purity substantially determining the quality of the imprint or of the print image. A further achievement is that the container wall of the respective container, which was produced by blow moulding a preheated preform, still has an increased temperature during treatment, i.e. especially during printing, which, for example when using printing colours or printing inks or primers which are water-based, advantageously affects the targeted drying of the drops when impacting the substrate, a higher resolution can thus be generated. Furthermore, the drying or curing of the respective printing colour or of the primer is accelerated.

However, the characteristic of the invention is that, already prior to drape forming or blow moulding the respective container, its angular position or the angular position of a design feature of interest of the container is captured or determined and this position or the positional data corresponding to this position is passed to the treatment line or to the local at least one treatment station and/or used there, namely for a controlled alignment of the respective container during treatment or during printing and/or for a controlled initiation of the treatment process or printing process depending on the positional data. Inter alia, this ensures that the print image is applied to each container in a specified spatial relation to the design feature, said spatial relation determining the container surface to be printed, especially a container surface which is to receive the imprint for an optimum appearance of the printed container. For example, this is possible because the respective preform is already held centred by a centring and holding element prior to handover into the drape forming or blow moulding machine, especially axially, radially and rotatingly fixed, and the preform or the container produced from it by drape forming or blow moulding remains on one and the same holding or centring element and, held centredly by it, is moved through the treatment line. Inter alia, this opens up the possibility of providing a coding on the respective holding or centring element, for example in the form of an encoder ring, said coding enabling the angular position to be captured or determined.

By scanning or capturing the coding with at least one sensor (sensor scanning) prior to blow moulding, the for example random angular position of the respective holding or centring element with the preform prior to blow moulding in relation to its axis is captured in detail. This captured angular position then is in a defined angular relation to the respective blow mould used for drape forming or blow moulding of the container or to the design feature of interest created with this blow mould. After blow moulding, the respective container can be aligned by another sensor scanning of the coding of the respective centring and holding element and taking into account the angular position, which is captured prior to blow moulding, at the treatment station concerned for the treatment or for the printing and/or, at the treatment station concerned, the treatment process or printing process can be initiated in a controlled manner with the container rotating about its container axis at the angular position captured prior to blow moulding or at an angular position derived herefrom.

In principle, there also is the possibility of aligning the respective centring and holding element prior to blow moulding by sensor scanning the coding in a specified angular position, i.e. an angular position for the centring and holding element is determined, said angular position being in a defined angular relation to the respective blow mould used for drape forming or blow moulding or to the design feature created with this blow mould. With this angular position determined prior to blow moulding, the container is then again aligned at the at least one treatment station, by turning the container about its container axis, for the treatment or for the printing and/or the initiation of the treatment process or printing process.

If the blow moulding machine has a number of drape forms or blow moulds, it can be appropriate, when aligning the respective container for the treatment or for the printing and/or during initiation of the treatment process or printing process at the at least one treatment station, to also take into account the respective position held by the blow mould used for blow moulding the container, especially if there are greater tolerances as regards the arrangement and/or positioning of the blow moulds, for example at a rotating rotor of the blow moulding machine. The position of the respective blow mould can for example be taken into account by sensor scanning at least one coding at the blow moulds and by generating corresponding positional data or correction signals or correction values which are taken into account when aligning the containers at the at least one treatment station and/or when initiating the treatment process or printing process. In principle however, it is also possible to form, for example during a test run of the blow moulding machine, correction values for the local blow moulds taking into account their positions and to store them in a machine control so that these correction values can then be taken into account when aligning the containers and/or when initiating the respective treatment process or printing process.

There is the further possibility of performing with the angular position, captured or determined prior to blow moulding, of the respective centring and holding element at the at least one treatment station, a preliminary or coarse alignment of the respective container, which is then followed by a direct, preferably non-contact scanning of the respective container or of the design feature of interest, namely for an exact alignment of the container and/or for the initiation of the treatment process or printing process. This scanning, for example, is performed with an optoelectric device known, for this purpose, to those skilled in the art.

If the blow moulding machine and the subsequent treatment line are designed such that the holding or centring elements and thus the containers held thereon have a defined angular position not only during blow moulding, but this defined angular position is also maintained during the movement through the treatment line, then the respective container at the at least one treatment station has a defined angular position. In this connection, it is then for example possible, for exact alignment of the respective container and/or for initiating the treatment process or printing process, to scan the container or the local design feature of interest and, in respect of the design feature, to accurately align it in a specified angular position and/or, when capturing the design feature, to initiate the treatment process or printing process, possibly taking into account correction values which take into account the location or position of the respective blow mould. In the invention, the printing of the containers, which are produced by drape forming or blow moulding, directly on their outer container surfaces is preferably performed electronically or digitally, i.e. with at least one print head operating according to the inkjet method. The application of a primer forming a bond layer or intermediate layer, i.e. the application of a mass forming an undercoat for the imprint (print image), too, is preferably performed by means of such a print head, provided that such a primer or undercoat is required. In principle, of course, there also is the possibility of spraying on the primer or applying it by means of a roller or immersion bath wherein, however, compared to a printing method, the substrate surface to be covered cannot be changed or determined in an analogue and flexible manner.

If the drying or curing (crosslinking) of the imprint and/or the undercoat is performed at at least one treatment station by UV radiation, it is preferred that a disinfection or sterilisation of the respective container also be performed at this treatment station, with UV radiation, for example using different UV radiation sources, possibly also with different spectra or using a common UV radiation source.

Further developments, advantages and possible applications of the invention can also be taken from of the following description of execution examples and from the figures. In principle, all features described and/or pictorially represented, for themselves or in any combination, are the subject matter of the invention, irrespective of their summary in the claims or their retrospectivity. The content of the claims is also made an integral part of the description.

BRIEF DESCRIPTION OF THE FIGURE

The invention is described below in greater detail using the figures, by means of an execution example, with.

DETAILED DESCRIPTION

Figure 1:
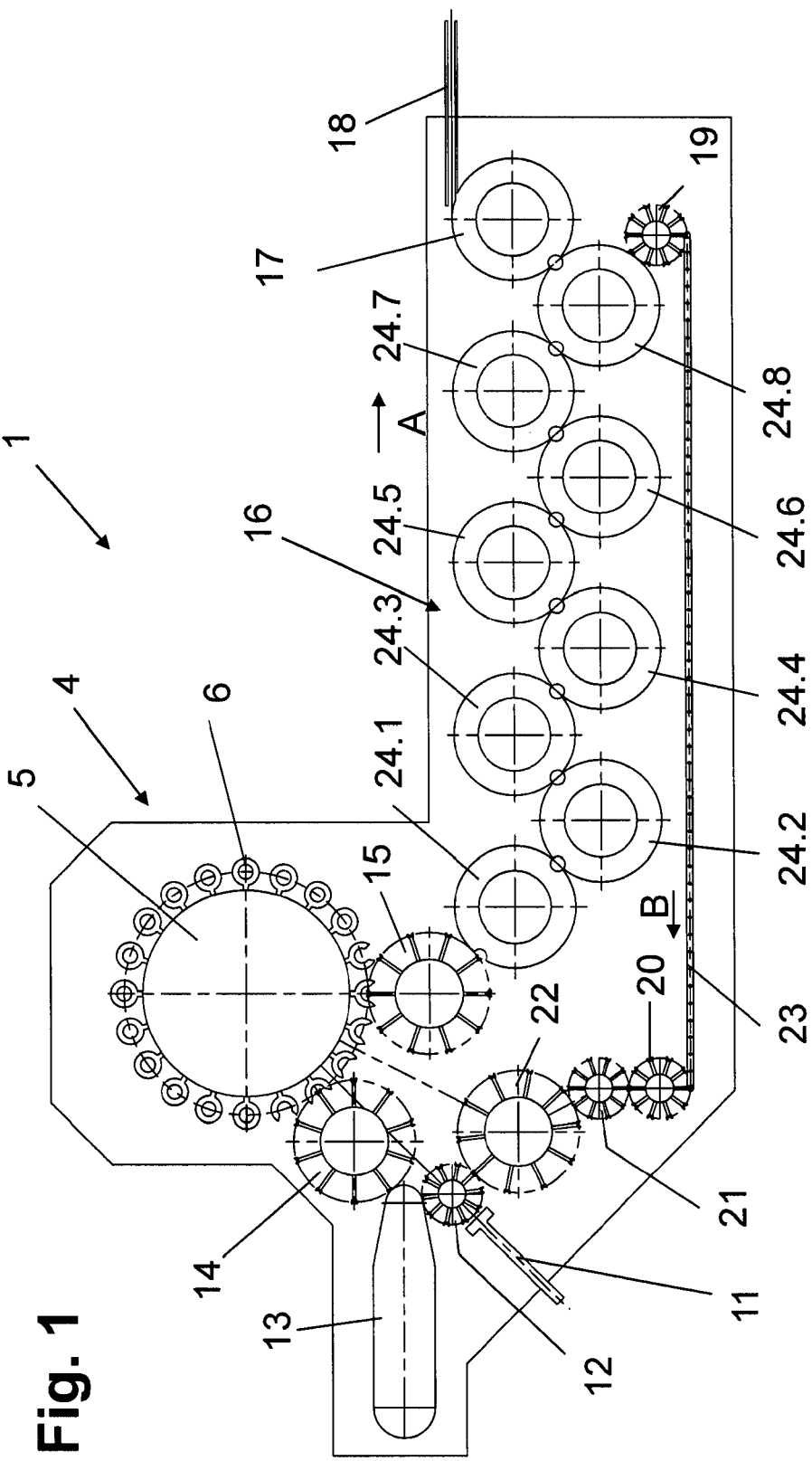
FIG. 1 showing in simplified representation and in plan view: a system for producing containers in the form of plastic bottles, for example in the form of PET bottles, by drape forming or blow moulding and for subsequent treatment of the containers produced.

The system, which is shown and generally designated 1 in FIG. 1, serves to produce containers in the form of bottles 2 made from plastic, preferably from PET, by drape forming or blow moulding using preforms 3 made from this plastic, for example from PET, and to subsequently treat the bottles 2 produced.

Figure 2:
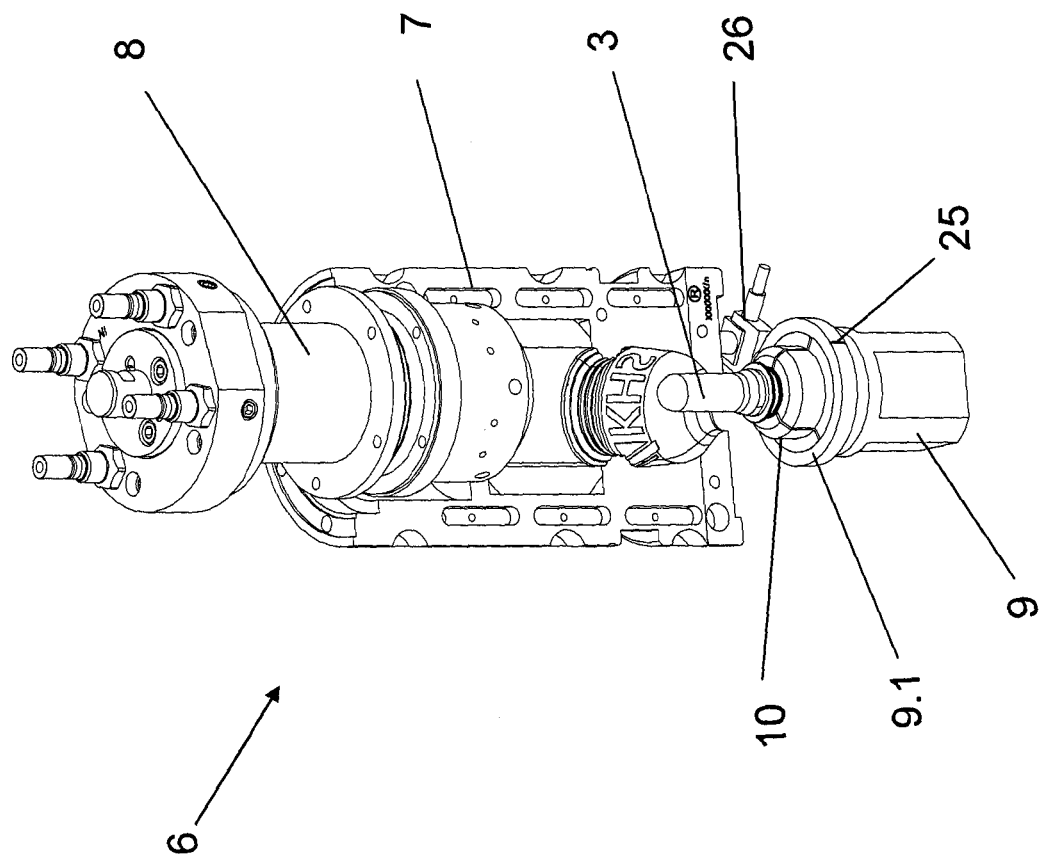
FIG. 2 showing in partial representation: a drape form or blow mould of a container drape forming or blow moulding machine of the system of FIG. 1, together with a bottle which is held by a centring and holding element or a container gripper in the area of the bottle mouth and produced with the blow mould.
Figure 3:
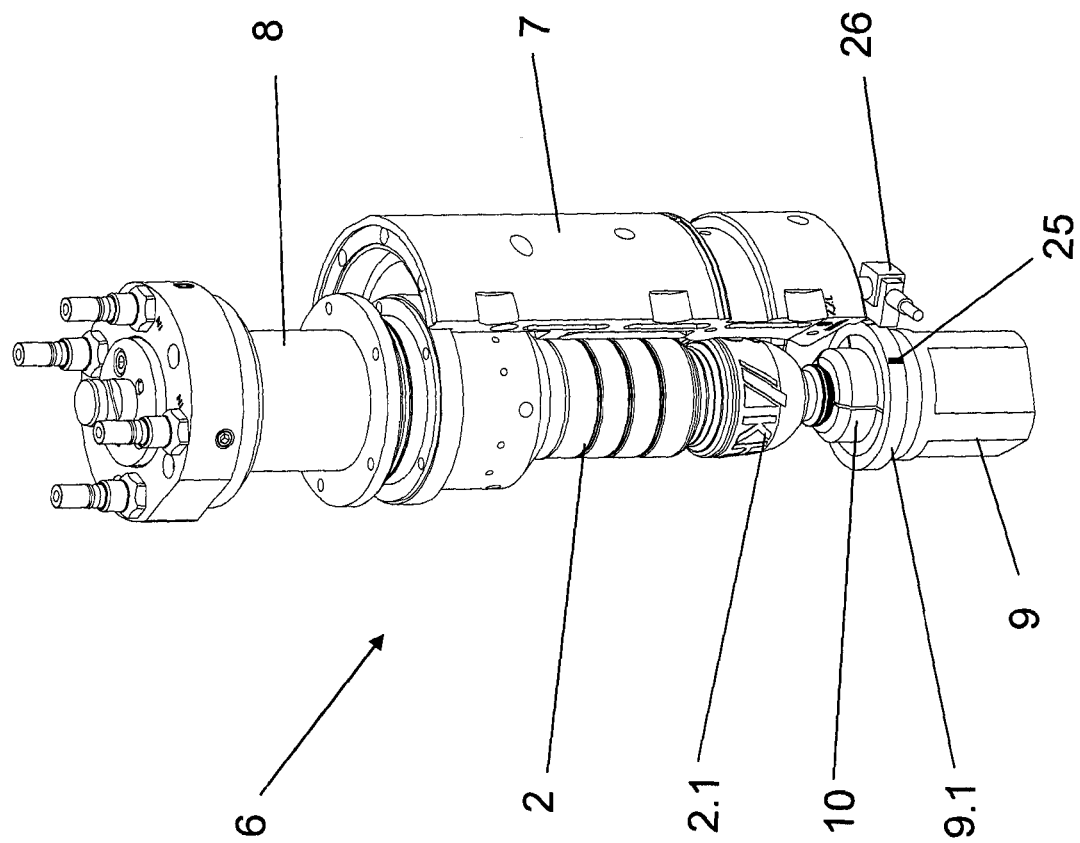
FIG. 3 showing in perspective representation: the opened blow mould together with a preform held by a centring and holding element or container gripper prior to drape forming or blow moulding the respective bottle.

For this, the system 1 comprises, inter alia, a drape forming or blow moulding machine 4 with a rotor 5 rotatingly drivable about a vertical machine axis, with a number of blow moulds 6 provided and distributed at said rotor's circumference at equal angular distances. These are of a multipart design in the manner known to those skilled in the art, namely, inter alia, consisting of two dish-shaped lateral blow mould elements 7 of which, in FIGS. 2 and 3, only one element each is shown, and of an upper blow mould element 8 which closes the moulding space of the blow mould 6 at its top. During drape forming or blow moulding, the moulding space of the respective blow mould 6 is closed on the underside by a centring or carrier element 9 (puck) at which, initially, the respective preform 3 is held centred by in the area of its open end which forms the subsequent bottle opening and then also the bottle 2 formed by drape forming or blow moulding is held centred in the area of its bottle opening, namely by means of a number of holding or clamping jaws 10 which are movable radially relative to a central axis of the centring and holding element 9 and thus to the axis of the preform 3 and of the bottle 2.

The general function of the system 1 can be described such that the preforms 3 supplied via a transport line 11 initially pass via a transport star 12 to a preheating line 13 (preform oven) and, after preheating in the preheating line 13, are each handed over individually, via a further transport star 14, and successively to a blow mould 6. Immediately after blow moulding, the bottles 2 produced reach, via a transport star 15, a treatment line 16 in which, moved in a transport direction (arrow A), they are treated in the manner described below in more detail. After passing through the treatment line 16, the treated bottles 2 reach, via a container outfeed for example formed by a transport star 17, an outer transporter 18 via which the bottles 2 are passed to a further application, for example to a filling machine.

A characteristic of system 1 is that each preform 3, as early as its handover from the transporter 11 to the transport star 12, is locally received by a centring or holding element 9 and, at its open end pointing down, is centredly clamped between the clamping jaws 10 of this centring and holding element, and that not only each preform 3, centredly held by its own centring and holding element 9, passes through the preheating line 13 and the transport star 14 to a blow mould 6 each of the drape forming or blow moulding machine 4 and the bottle 2 formed from it is held by the centring and holding element within the blow moulding machine 4, but that the respective centring and holding element 9 accompanies the produced bottle 2 on its way via the transport star 15 through the treatment line 16 until the end of this treatment line and always holds and centres it in the manner required. Of course, the invention also includes that the preform with the top opening is suitably transported and held by means of a centring and holding element which, here, also means a gripper. The respective treated bottle 2 is only released from its centring and holding element 9 at the container outfeed (transport star 17), so that said centring and holding element can then be moved back (arrow B) via a transport line which, in the system 1 shown in FIG. 1, is formed by the transport stars 19-22 and the linear transport 23, to the transport star 12 for receiving a further preform 3.

The treatment line 16 immediately following the container outfeed (transport star 15) of the drape forming or blow moulding machine 4 consists, in the embodiment shown, of a number of treatment modules, i.e. for example of altogether eight treatment modules 24.1-24.8 which, according to the significance of their reference numbers in the transport direction A, in which the bottles 2 are moved through the treatment line 6, directly follow each other, namely such that the bottles 2 held by their centring and holding elements 9 are each passed together with this centring and holding element at handover areas from a treatment module 24.1-24.7 to a further treatment module 24.2-24.8. The treatment module 24.8 is designed such that, after completion of the treatment, the respective bottle 2, released from its centring and holding element 9, is handed over to the transport star 17 which forms the container outfeed.

The treatment modules 24.1-24.8 each essentially consist of a rotor rotatingly drivable about a vertical axis, said rotor having a multitude of treatment positions each receiving a centring and holding element 9 with the bottle 2 held thereon. Corresponding to the treatment, devices for the treatment are provided at the treatment modules 24.1-24.8 or the local treatment stations. The rotors of the treatment modules 24.1-24.8 are driven synchronously with the remaining rotating elements of the system 1 such that the rotors of successive treatment modules 24.1-24.8 in the transport direction A each counter-rotate, so that the centring and holding elements 9 with the bottles 2 move on a wave-shaped transport path through the treatment machine 16. The treatment of the bottles 2 in the individual treatment modules 24.1-24.8 each occurs in an angular area of the rotary motion of the associated rotor and thus, especially, also for special treatment types by means of controlled rotation or pivoting of the bottles 2 about their vertical bottle axes. For this, the centring and holding elements 9 are for example each equipped with a corresponding drive which, after coupling to the rotor or the workstation of a processing module 24.1-24.8, performs the controlled rotating or pivoting motion, necessary for processing, of the respective bottles 2 about their bottle axes, or the respective centring and holding element 9 is coupled, after handover to a treatment station of a treatment module 24.1-24.8, to a locally provided drive for the controlled pivoting motion or rotating motion of the respective bottle 2 about its bottle axis.

In some of the treatment modules 24.1-24.8, the bottles 2 are printed on their exterior surfaces or shell surfaces, preferably with a multi-coloured imprint, wherein each colour set of this imprint e.g. is then created in a stand-alone treatment module. At the treatment stations of these treatment modules, corresponding print heads are provided, preferably digital print heads, for example print heads operating according to the so-called inkjet method, said print heads being selected according to an electronically stored printing forme.

At least one treatment module is designed for drying or curing the imprint or the printing colours or inks by energy input, for example by heating, but preferably using a non-thermal or substantially non-thermal energy radiation (e.g. UV radiation, beta radiation, microwave radiation etc.), wherein it may well be appropriate to equip each treatment module for printing a printing colour simultaneously with a device for pre-curing or pre-drying this printing colour or to design the treatment line 16 such that each treatment module for printing is followed by a treatment module for pre-drying or pre-curing or for drying or curing the printing colour in the transport direction. At least one of the treatment modules 24.1-24.8 further serves to disinfect or sterilise the bottles 2, especially at their mouth areas and/or inner surfaces, again preferably by treating with an energy radiation and very preferably with the same type of energy radiation also used for drying or curing the printing colours.

The disinfection or sterilisation as well as the drying or curing of the printing colours is preferably performed in one and the same treatment module, e.g. in the treatment module 24.8 or at the local workstations where the disinfection or sterilisation of the centring and holding elements 9 returned at the transport star 12 is then also preferably performed.

Each centring and holding element 9 is provided, at an annular surface 9.1 concentrically enclosing the centring and holding element axis, with at least one coding 25 (e.g. encoder ring), said surface capable of being captured by at least one sensor 26 and defining the angular position of the respective centring and holding element 9 in respect of the centring and holding element axis. The coding 25 can be designed in many different ways, for example as an optoelectric coding capable of being captured, e.g. in the form of markings or surface areas which reflect light differently or in the form of breakthroughs or windows and/or in the form of a transparent surface provided with markings etc., and/or as magnetic coding in the form of a multitude of successive magnetic poles of different polarities in the circumferential direction of the centring and holding element 9 and/or as mechanical coding in the form of successive peaks and troughs in the circumferential direction of the centring and holding element 9 or of the annular surface 9.1, etc. The sensor 26, of course, is adapted to the respective type of coding so that it supplies a sensor signal corresponding to the angular position of the centring and holding element 9.

On the underside of each blow mould 6 or on the underside of the local blow mould element 7, a sensor 26 is provided so that it can be used to capture or determine the angular position of the centring and holding element 9 during drape forming or blow moulding of the respective bottle 2 and which is in a known or defined angular relation to a design feature of interest 2.1 of the produced bottle 2 which, for example, is formed by an embossing in the bottle 2 or by at least one seam formed during blow moulding.

The angular position captured or determined with the at least one sensor 26 or corresponding positional data is passed to the subsequent treatment line 16, especially for controlling the treatment modules and their treatment stations used for printing the bottles 2 such that not only the individual colour sets of a multi-coloured imprint are printed in the required position on the respective bottle 2 but the entire imprint is in a required position relative to the design features 2.1 created during drape forming or blow moulding.

As initially described, the for example random angular position of the respective holding or centring element 9 with the preform 3 prior to blow moulding is captured by scanning or capturing the coding 25 with the sensor 26 prior to blow moulding. This captured angular position then is in an angular relation, which is defined or specified by the construction of the blow moulding machine 4, to the respective blow mould 6 used for drape forming or blow moulding the bottle 2 or to the design feature 2.1 created with this blow mould. After blow moulding, the respective bottle 2 can be aligned, by re-scanning the coding 25 of the respective centring and holding element 9 and taking into account the angular position, captured prior to blow moulding, at the relevant treatment station of the treatment line 16 for the printing and/or, at this treatment station, the printing process can be initiated in a controlled manner, with the bottle 2 rotating about its bottle axis, at the angular position captured prior to blow moulding or at an angular position derived therefrom.

In principle, there also is the possibility that the respective centring and holding element 9 is aligned in a specified angular position prior to blow moulding at the respective blow mould 6 by scanning the coding 25, i.e. an angular position is determined for the centring and holding element 9, said angular position being in a defined angular relation to the respective blow mould 6 and thus to the design feature 2.1 created with this blow mould 6. With this angular position determined prior to blow moulding, in turn, the alignment of the bottle for printing and/or initiating the printing process then take place at the at least one treatment station of the treatment line 16, while the bottle 2 rotates about its bottle axis.

In a particularly advantageous design, there is no sensor for determining the angular position of the centring and holding element. In such a design, the relative angular position of centring and holding element 9 and of the blow mould or of the parts of the blow mould is used as a control variable. Thus, for example, the container's seam position, which is always uniquely defined by the blow mould, as regards the angular position, can be adopted or determined as a zero value for the angular position of the container and/or of the centring and holding element, or this known and unique data of the angular position can be further processed in another suitable manner by the system control.

Another version can be provided in which, given anti-twist handover of the containers from the blowing wheel to one or the subsequent treatment devices and/or transport devices, in order to achieve a fine alignment of the angular position, only a very small angle of the container has to be optically captured, for which a single camera or comparable optical capturing system is sufficient.

It can be appropriate, when aligning the respective bottle 2 for printing and/or when initiating the printing process at the at least one treatment station of the treatment line 16, to also take into account the location or position of the blow mould 6 used for blow moulding the bottle 2. For example, this can be performed by sensor scanning at least one coding at the blow moulds 6 and by generating corresponding correction signals or correction values which are taken into account when aligning the bottles 2 at the at least one treatment station and/or when initiating the printing process. In principle, however, it is also possible, for example in a test run of the blow moulding machine 4, to form correction values for the local blow moulds 6 which take into account their positions and to store them in a machine control of the system 1 so that these correction values can then be taken into account when aligning the bottles 2 and/or when initiating the respective printing process.

Furthermore, there also is the possibility of performing a pre-alignment or coarse alignment of the respective bottle 2 with the angular position, captured or determined prior to blow moulding, of the respective centring and holding element 9 at the at least one treatment station of the treatment line 16, which is then followed by a direct, preferably non-contact scanning of the bottle 2 or of the design feature of interest 2.1, namely for an exact alignment of the bottle 2 and/or for initiating the printing process. This scanning is then performed, for example, with an optoelectric device not shown but known, for this purpose, to those skilled in the art.

It is understood that the sensors which capture at least one coding 25 are also provided at the treatment stations at which an alignment of the respective bottle 2 is required prior to its processing, for example prior to printing.

There further is the possibility of capturing or determining the angular position by means of the at least one sensor 26 for the alignment of the bottles 2 and/or initiation of the treatment after blow moulding already prior to handover of the respective centring and holding element to the respective blow mould 6, for example in the area of the transport star 14, with the design, however, then being such that, during handover of the respective centring and holding element 9 from the transport star 14 to a blow mould 6, there occurs no change in the angular position of the centring and holding element 9 or always only a consistent and precisely defined change in this angular position.

Substantial advantages of the system 1 or of the method performed with this system are, inter alia, that the bottles 2 are supplied to the treatment line 16 immediately after drape forming or blow moulding and thus a high degree of purity of the bottle surface is ensured which, inter alia, is critical to the quality of the print image. The outfeed star 15 of the blowing machine 4 simultaneously serves as infeed star of the treatment line 16 or of the local first treatment module 24.1. The direct connection of the treatment line 16 to the blow moulding machine 4 or to its outfeed star 15 further avoids excessive cooling of the bottles 2, thus achieving a heated surface for these which has a positive effect, especially when using water-based printing colours or printing inks and/or primers, on the drop formation during printing and thus on the quality of the print image. Heating the bottles 2 prior to printing is not required. Furthermore, the heated surface of the bottles 2 also promotes the drying or curing of the printing colours.

By retaining the bottles 2 at the respective centring and holding element 9 and by the coding 25 at the centring and holding elements 9, an optimum alignment of the bottles 2 during printing is easily possible. In particular, the coding which is needed anyway for the printing or for the positionally accurate application of the colour separations of a multi-coloured imprint or the pulse derived from said coding can already be used for drape forming or blow moulding in order to align the respective centring and holding element with the preform in a specified angular position such that the coding at the respective centring and holding element 9 is exactly matched to the respective bottle area to be printed. The respective blow mould 6 and the centring and holding element 9 are thus already matched when the respective bottle 2 is created.

As the bottles 2 are printed depending on the pulse generated when capturing the coding, an additional alignment of the respective bottle 2 is not required.

If the bottles 2 are for example disinfected or sterilised in the area of the bottle mouth and/or on the inner bottle surfaces by UV radiation from at least one UV radiation source, the curing or crosslinking of the printing colours is preferably also performed with UV radiation, preferably with a UV radiation of that radiation source and/or with that UV spectrum which is also used for disinfection or sterilisation.

The invention was described above using an execution example. It is understood that numerous changes and modifications are possible without departing from the inventive idea underlying the invention.

Thus, it was assumed above that the drape forming or blow moulding of the bottles 2 is performed such that these are oriented, at least after blow moulding, in an overhead position, i.e. with their bottle axes in a vertical or substantially vertical direction but with their bottle openings at the bottom, and are transported in this position through the treatment line 16, wherein the bottles 2 are then, for example in the transport star 17 which forms the container outfeed, turned or placed in a position with the bottle opening pointing up. Of course, with a corresponding design of the blow moulding machine 4 or the blow moulds 6, another position of the bottles 2 is also possible.

Above, it was further assumed that all units identified by the reference numbers 24.1-24.8 are treatment stations. Of course, there also is the possibility of designing the treatment line 16 such that only a part of these units are treatment modules, for example only the units 24.1, 24.3, 24.5 and 24.7, while the rest of the units, for example the units 24.2, 24.4, 24.6 and 24.8, essentially have the function of transport stars or at least partly the function of treatment modules for disinfecting or sterilising and/or drying or curing (crosslinking) the printing colours.

LIST OF REFERENCE NUMBERS 1 system
2 bottle
2.1 design feature
3 preform
4 blow moulding machine
5 rotor
6 blow mould
7, 8 blow mould element
9 centring and holding element
9.1 annular surface at the centring and holding element 9
10 clamping jaws
11 feed for preforms 3
12 transport star
13 preheating line or preform oven
14, 15 transport star
16 treatment line
17 container outfeed or transport star
18 outer transporter
19-22 transport star
23 conveying line
24.1-24.8 treatment module
25 coding or coding element (encoder ring)
26 sensor
A transport direction of the bottles 2 through the treatment line 16
B transport direction of the centring and holding element 9 (pucks) on the transport line 23

The invention claimed is:

1. A method comprising
introducing preforms into a production machine,
using a production process that is performed within said production machine, transforming preforms into corresponding plastic containers, and,
in a treatment station of a container-treatment line that follows said production machine, treating said plastic containers,
wherein using said production process comprises
holding a preform with a centering-and-holding element that comprises an encoding ring, and
prior to completion of said production process, scanning said encoding ring to determine determining first angular-position data that is associated with said preform, wherein said preform is located at a location that is before said container-treatment line, and
passing said first angular-position data to said treatment station for use in controlling said treatment station.

2. The method of claim 1, further comprising
after completion of said production process, holding a container with said centering-and-holding element, said container having been made from said preform,
moving said container through said container-treatment line, and using said centering-and-holding element, positioning said container at said treatment station,
wherein positioning is selected from the group consisting of rotating said container and aligning said container.

3. The method of claim 1, further comprising handing over said preform to a blow mold of a blow-molding machine after having already determined said first angular-position data.

4. The method of claim 1, further comprising handing over said preform to a blow mold of said blow-molding machine, and, after having completed said handover, determining said first angular-position data.

5. The method of claim 4, further comprising preheating said preform.

6. The method of claim 1, wherein determining first angular-position data comprises determining said first angular-position data prior to preheating a preform.

7. The method of claim 1, further comprising capturing information concerning said blow mold for forming second angular-position data, said information concerning said blow mold comprising information selected from the group consisting of location of the blow mold, position of the blow mold, location of a part of the blow mold that forms said design feature, and position of a part of said blow mold that forms said design feature.

8. The method of claim 7, further comprising correcting said first angular-position data using said second angular-position data.

9. The method of claim 7, controlling said treatment station using said second angular-position data.

10. The method of claim 7, further comprising, at said treatment station, using said second angular-position data to align said container.

11. The method of claim 7, further comprising, at said treatment station, using said first and second angular-position data to align said container.

12. The method of claim 7, further comprising, at said treatment station, initiating a printing process controlled by at least one of said first angular-position data and said second angular-position data, and rotating said containers about container axes thereof while printing.

13. The method of claim 1, further comprising, at said treatment station, at least one of aligning and coarse aligning said container based at least in part on said first angular-position data.

14. The method of claim 1, further comprising, at said treatment station, after having taken into account at least one of said first and second angular-position data, initiating treatment of said container.

15. The method of claim 1, further comprising, at said treatment station, aligning a container, and, while said container is being aligned, printing on said container.

16. The method of claim 1, further comprising causing treatment of said container at a first treatment station that has a first rotating drivable transport element, and causing treatment of said container at a second treatment station that has a second rotating drivable transport element, wherein said first treatment station and said second treatment station are successive treatment stations in a transport direction of containers through said treatment line.

17. The method of claim 1, further comprising at least one of drying and curing at least one of a printing color and printing ink used for printing on said container and simultaneously disinfecting said containers in a partial area thereof.

18. The method of claim 17, wherein simultaneously disinfecting said containers in a partial area thereof comprises illuminating said partial area with UV radiation.

19. The method of claim 1, further comprising treating a container immediately after said production process.

20. The apparatus of claim 1, wherein said location is said production machine.

21. The apparatus of claim 1, wherein said location is a conveying line that precedes said production machine.

22. The apparatus of claim 1, wherein said location is a treatment line that precedes said production machine.

23. The apparatus of claim 1, wherein using a production process that is performed within a production machine comprises using a drape forming process that is performed within a drape forming machine.

24. The apparatus of claim 1, wherein using a production process that is performed within a production machine comprises using a blow molding process that is performed within a blow molding machine.

* * * * *